(12) United States Patent
Raskin

(10) Patent No.: US 11,709,577 B2
(45) Date of Patent: Jul. 25, 2023

(54) SYSTEMS AND METHODS FOR PROVIDING A CAMPAIGN DESIGN PLATFORM HAVING A COMPONENT PLUG-IN FRAMEWORK

(71) Applicant: Selligent, S.A., Braine-l'Alleud (BE)

(72) Inventor: Pieter Raskin, Braine-l'Alleud (BE)

(73) Assignee: Selligent, S.A., Braine-l'Alleud (BE)

( * ) Notice: Subject to any disclaimer, the term of this patent is extended or adjusted under 35 U.S.C. 154(b) by 71 days.

(21) Appl. No.: 17/238,974

(22) Filed: Apr. 23, 2021

(65) Prior Publication Data
US 2021/0357991 A1 Nov. 18, 2021

Related U.S. Application Data

(60) Provisional application No. 63/025,061, filed on May 14, 2020.

(51) Int. Cl.
*G06F 3/0486* (2013.01)
*G06F 3/04817* (2022.01)
*G06Q 30/02* (2023.01)
*G06Q 30/0241* (2023.01)
*G06Q 30/0251* (2023.01)

(52) U.S. Cl.
CPC ........ *G06F 3/04817* (2013.01); *G06F 3/0486* (2013.01); *G06Q 30/0276* (2013.01); *G06Q 30/0251* (2013.01)

(58) Field of Classification Search
CPC ...... G06F 3/04817; G06F 3/0486; G06F 8/34; G06Q 30/0276; G06Q 30/0251
See application file for complete search history.

(56) References Cited

U.S. PATENT DOCUMENTS

| | | | | |
|---|---|---|---|---|
| 2007/0038756 A1* | 2/2007 | Waldorf | ............... | G06F 40/143 709/227 |
| 2008/0120121 A1* | 5/2008 | Gilbert | ................ | G06Q 10/063 705/7.26 |
| 2008/0320405 A1* | 12/2008 | Van Wyk | ............... | G06Q 10/06 715/764 |
| 2009/0063221 A1* | 3/2009 | Jonath | .................... | G06Q 10/06 705/7.39 |
| 2010/0217650 A1* | 8/2010 | Hartnell | ............ | G06Q 30/0201 705/7.29 |
| 2010/0262557 A1* | 10/2010 | Ferreira | ............... | G06Q 10/067 705/348 |
| 2019/0236680 A1 | 8/2019 | Kounine et al. | | |
| 2020/0344188 A1 | 10/2020 | Raskin et al. | | |

* cited by examiner

*Primary Examiner* — Ting Z Lee
(74) *Attorney, Agent, or Firm* — Crowell & Moring LLP

(57) ABSTRACT

Systems and methods for facilitating user design of a computerized marketing system executable campaign or message thereof, include: providing a graphical user interface for user interaction with a virtual canvas; retrieving, from a database, component data useable by the virtual canvas module to visualize component icons; visibly arranging, within the virtual canvas and in response to user interaction with the virtual canvas via the user interface, the component icons into at least one of: a campaign design or a message design, wherein each component icon represents an action to be taken by the computerized marketing system in executing the campaign and/or the message thereof; and generating, by a build engine, the campaign and/or the message from and in accordance with the respective campaign design and/or message design.

16 Claims, 11 Drawing Sheets

SYSTEMS AND METHODS FOR PROVIDING A CAMPAIGN DESIGN PLATFORM HAVING A COMPONENT PLUG-IN FRAMEWORK

The present invention relates to computer and internet technology, namely, systems and methods for providing a campaign design platform having a component plug-in framework.

The objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples.

BRIEF DESCRIPTION OF THE DRAWINGS

FIGS. 4 and 5A-D illustrate exemplary properties palates in accordance with at least one aspect of the invention.

DETAILED DESCRIPTION OF THE PREFERRED EMBODIMENTS

Figure 1:
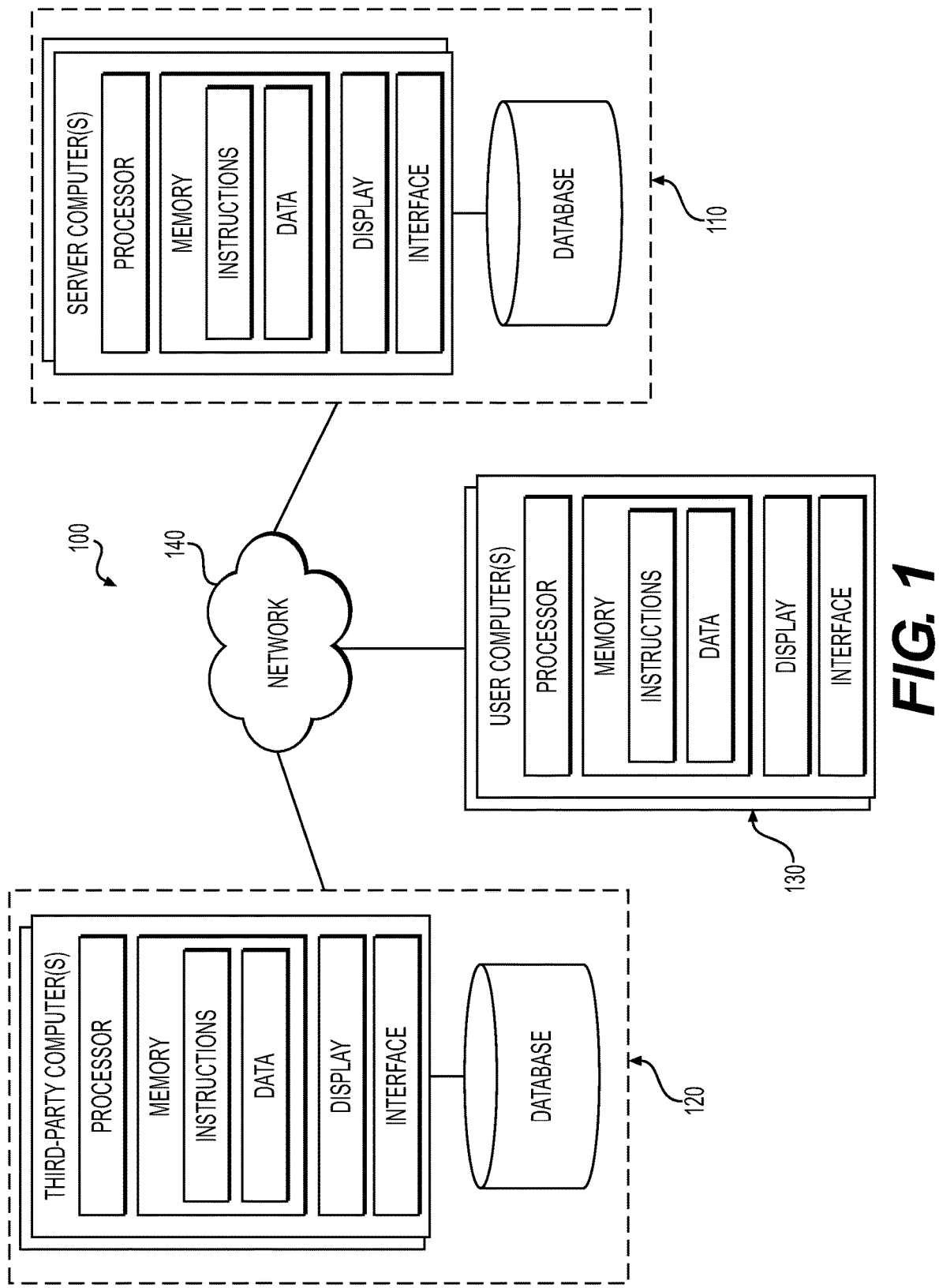
FIG. 1 illustrates a system in accordance with at least one aspect of the invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

The present invention generally relates to a campaign design platform via which a user can design campaigns, or aspects thereof, for execution by a computerized marketing system.

FIG. 1 illustrates an exemplary system 100 in accordance with one or more aspects of the invention. In general, the system provides the campaign design platform via which the user can design campaigns, or aspects thereof, for execution by the computerized marketing system. As used herein, the term "campaign" refers to a set of operations or actions effectuated by the marketing system, as well as the interaction between such operations or actions and with external stimuli (e.g., externally provided data representing consumer action). As such, the operations or actions may be represented by a series of instructions for execution by the marketing system. The term "campaign" is also used herein to refer what would commonly be understood as the entire campaign (e.g., an e-mail marketing strategy), as well as sets of operations that are not the entire campaign (e.g., an e-mail design).

The system generally comprises a server system 110 coupled to one or more one or more third-party server systems 120, and one or more user computers 130, via a network 140.

The server system 110 generally supports the campaign design platform described herein, and may further support the marketing system. The server system 110 many include one or more server system computers connected to the network 140. Each server system computer may include computer components, including one or more processors, memories, displays and interfaces, and may also include software instructions and data for executing the functions of the server system 110 described herein. The server system 110 may also include one or more storage devices configured to store large quantities of data and/or information, and may further include one or more databases. For example, the storage device may be a collection of storage components, or a mixed collection of storage components, such as ROM, RAM, hard-drives, solid-state drives, removable drives, network storage, virtual memory, cache, registers, etc. The storage device may also be configured so that the server system computers may access it.

The third-party server systems 120 generally support third-party systems, services and/or platforms, such as for example, websites, databases, online services, communication platforms, and the like, which may be utilized by the marketing system in the execution of one or more campaigns. The third-party server systems 120 may include one or more third-party server computers connected to the network 140. Each third-party server computer may include computer components, such as one or more processors, memories, displays and interfaces, and may also include software instructions and data for executing the functions of the third-party server systems 120. The third-party server system 120 may also include one or more storage devices configured to store large quantities of data and/or information, and may further include one or more databases. For example, the storage device may be a collection of storage components, or a mixed collection of storage components, such as ROM, RAM, hard-drives, solid-state drives, removable drives, network storage, virtual memory, cache, registers, etc. The storage device may also be configured so that the third-party server system computers may access it.

The third-party server systems 120, including components, services, databases, software and platforms thereof, may be accessible to the server system 110 via one or more application programming interfaces (APIs). The APIs may be provided by respective third-party server systems 120, and may be stored by the server system 110 for use in accessing respective third-party server systems 120.

The user computers 130 generally provide a user with the ability to access and otherwise interact with the campaign design platform, and may further provide the user with the ability to access and otherwise interact with the marketing system. Such user interaction may be via a graphical user interface, as is generally known in the art. The user computers 130 are generally computing devices, which may be mobile (e.g., laptop computers, tablet computers, smartphones, PDAs, wearables, etc.) or stationary (e.g., desktop computers, etc.) devices connected to the network 140. The user computers 130 may include computer components, such as one or more processors, memories, displays and interfaces, and may also include software instructions and data for executing the functions of the user computers 130.

The respective processors may instruct the respective computer components to perform various tasks based on the processing of information and/or data that may have been previously stored or have been received, such as software instructions and/or data stored in the memory(s). The processors may be standard processors, such as a central processing unit (CPU), or may be dedicated processors, such as an application-specific integrated circuit (ASIC) or a field programmable gate array (FPGA), or a graphical processing unit (GPU).

The respective memories may store at least software instructions and/or data that can be accessed by the processors. For example, the memories may be hardware capable of storing information accessible by the processors, such as a ROM, RAM, hard-drive, CD-ROM, DVD, write-capable, read-only, etc. The set of instructions may be included in software that can be implemented on the computers. It should be noted that the terms "instructions," "steps," "algorithm," and "programs" may be used interchangeably. The data can be retrieved, manipulated or stored by the processors in accordance with the software instructions or other sets of executable instructions. The data may be stored as a collection of data. Accordingly, the computers may include one or more respective software applications, stored in respective memories, which software applications, when executed by the processors configures the computers to execute the various functions described herein.

The respective displays may be any type of device capable of visually communicating data, such as a liquid-crystal display ("LCD") screen, a plasma screen, etc. The respective interfaces allow users to communicate with the computers and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The network may be any type of network, wired or wireless, configured to facilitate the communication and transmission of data, instructions, etc. from one component to another component of the network. For example, the network may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

It is to be understood that the configuration illustrated in FIG. 1 serves only as an example and is thus not limited thereto. The system, for instance, may include numerous other components, or more than one of each component, connected to network, and the network may be connected to other networks. As discussed, the system may be implemented via computer executed software. As such, the various functionalities of the system may be understood in terms of computer executed software modules in accordance with a system architecture.

Figure 2:
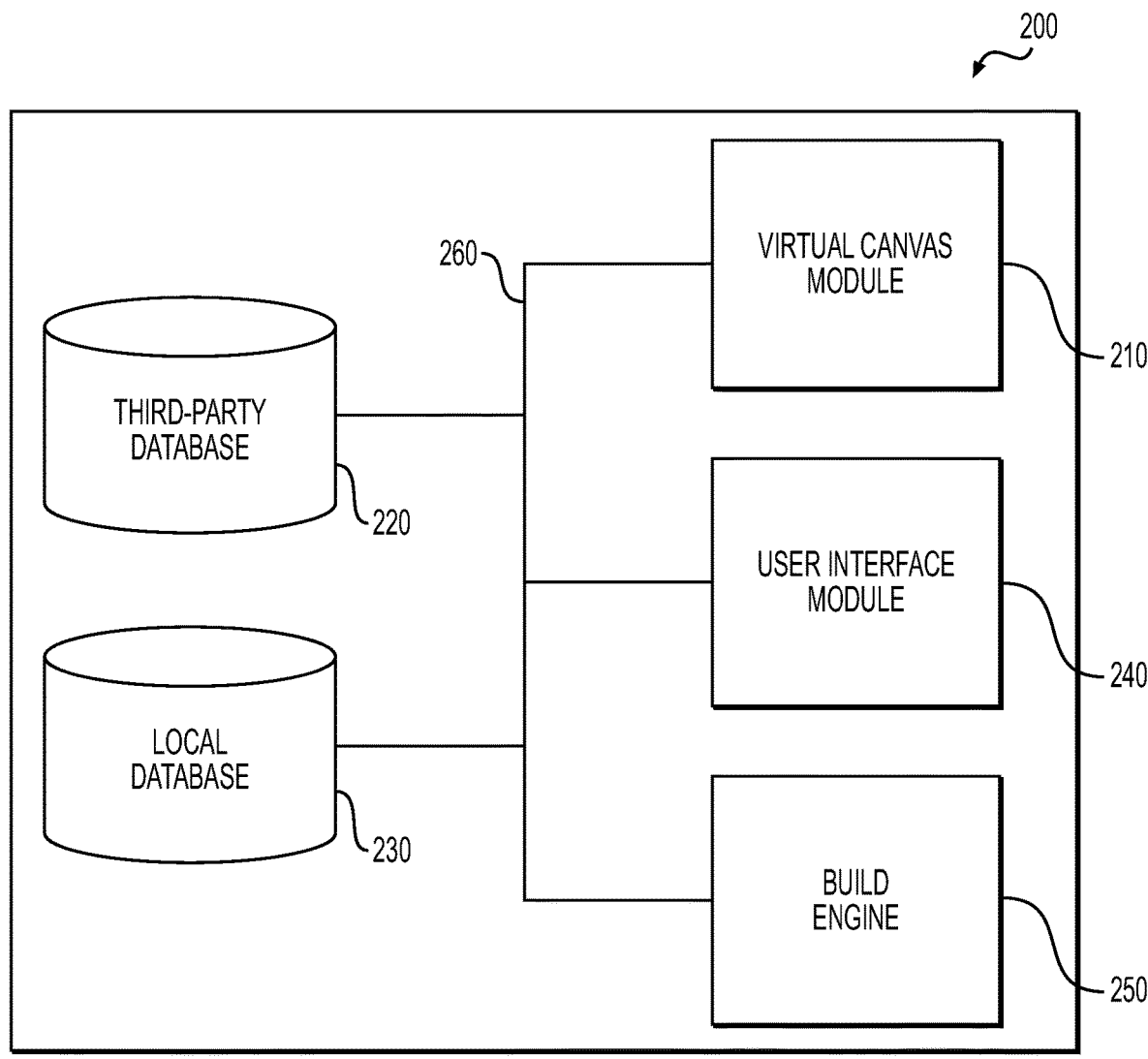
FIG. 2 illustrates an exemplary system architecture in accordance with at least one aspect of the invention.

FIG. 2 illustrates an exemplary system architecture 200 in accordance with at least one aspect of the invention. In general, the system architecture is embodied in the system, and may include one or more functional modules (or engines), including: a virtual canvas module 210, one or more third-party databases 220, a local database 230, a user interface module 240, which supports the graphical user interface, and a build engine 250, each communicatively coupled via network 260.

The virtual canvas module 210 is supported by server system 110, and generally provides aspects of the campaign design platform, which includes a virtual canvas via which one or more components may be arranged, by the user via the graphical user interface, so as to generate the campaign that is implementable via the marketing system. Each component represents a specific action to be taken by the marketing system, and a set of components reflects a set of actions that defines the campaign, or aspects thereof. Each component may also have one or more associated triggers, which represent events that progress the implementation of the campaign by the marketing system from component to component. Accordingly, the one or more components and associated triggers may be utilized by the user to design the campaign, or aspects thereof, via the campaign design platform. FIGS. 3-7 illustrate exemplary virtual canvases, as visualized via the graphical user interface, the operations of which will be described herein with reference to those figures.

Remaining with FIG. 2, the one or more third-party databases 220 are respectively supported by the associated third-party server system 120. The third-party databases 220 retrievably store component data related to the one or more components offered by the third-party that may be utilized by the user to design the campaign, or aspects thereof, via the campaign design platform. The component data includes visualization data and actualization data. Visualization data is software code that allows the virtual canvas module 210 to visualize the respective component via the graphical user interface. As such, the visualization data for given components may be accessed by the virtual canvas module 210 via use of respective APIs. Briefly, as shown in FIGS. 3-7, the visualization of the component may include: visualizing component icons representing the component in the virtual canvas, and visualizing adjustable or otherwise customizable properties of the component in the virtual canvas. Actualization data is software code that allows the marketing system to implement the corresponding action(s) of the component.

The third-party database 220 may be accessible via one or more APIs for the retrieval of visualization data and/or actualization data of components with which the APIs are associated. The APIs may be retrievably stored in the local database 230, which is supported by the server system 110, and may be provided to the server system 110 by the third-party server systems 120. It will be understood, that component data, including visualization data and/or actualization data, may additionally or alternatively be stored in the local database 230.

As also shown in FIG. 2, the local database 230 may store a record of the campaign design. The record may include the inclusion, arrangement and/or interaction of various components, as well as their respective properties, within the user-designed campaign, and may be updateable to reflect the current state of the campaign design.

The build engine 250 is supported by server system 110, and generally provides aspects of the campaign design platform, which includes generating the campaign for implementation by the marketing system. As such, the actualization data for given components of the designed campaign may be accessed by the build module, via use of respective APIs, which actualization data may then be utilized to generate the campaign. The generation of the campaign may include providing appropriate software code where indicated by the campaign design.

The operation of aspects of the campaign design platform will be described with reference to various embodiments.

Figure 3:
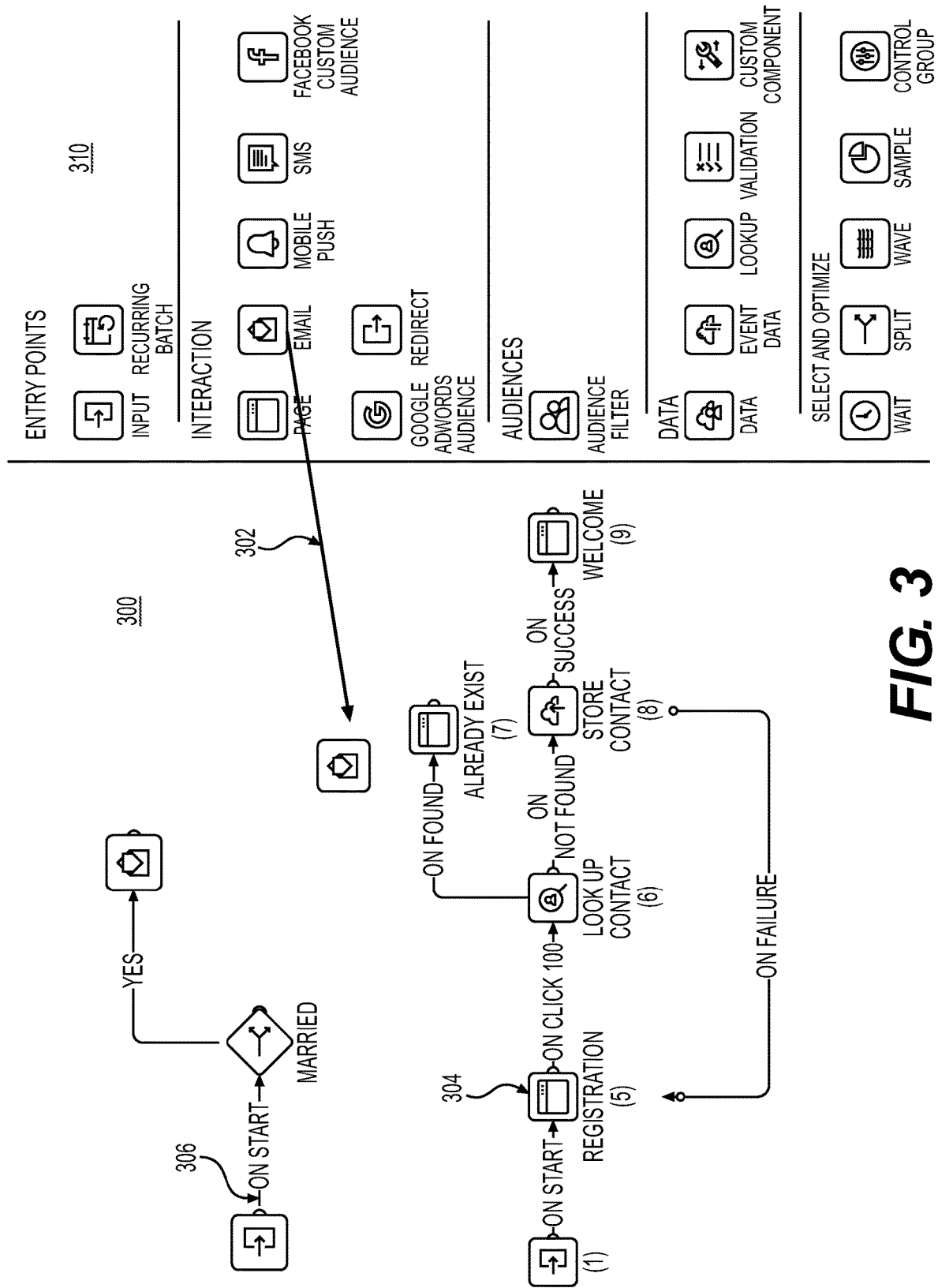
FIG. 3 illustrates aspects of the campaign design platform in which the virtual canvas may be utilized to generate one or more scenarios that are implementable via the marketing system.

FIG. 3 illustrates aspects of the campaign design platform in which the virtual canvas may be utilized to generate one or more scenarios that are implementable via the marketing system. More particularly, FIG. 3 schematically shows an exemplary graphical user interface representing the virtual scenarios canvas 300.

As shown in FIG. 3, the virtual scenarios canvas 300 is an interactive graphical environment via which the scenario may be planned and defined via drag-and-drop 302 arrangement of component icons 304, which may also include the graphical connection of component icons via trigger icons 306. The virtual scenarios canvas 300 may include a component palate 310, in which available components are visualized as their respective component icons 304 for drag-and-drop arrangement within the scenarios canvas area.

FIG. 3, also illustrates scenario (a) in the process of being designed using the campaign design platform. An "input" component is shown as initiating the scenario, the input component reflecting an initiating action of importing customer data from a local or third-party source. The input component is shown as being connected to a "married" component by an "on start" trigger. The on start trigger indicates that the start of the campaign, i.e., the execution of the input component, triggers the married component. The married component reflects a determination of whether the customer is married based on the imported customer data. The "yes" trigger connects the married component to an "e-mail" component, indicating that if the customer data shows the customer is married, the marketing system is to send an e-mail to the customer. Also illustrated is scenario (b) reflecting customer registration via a website.

Figure 4:
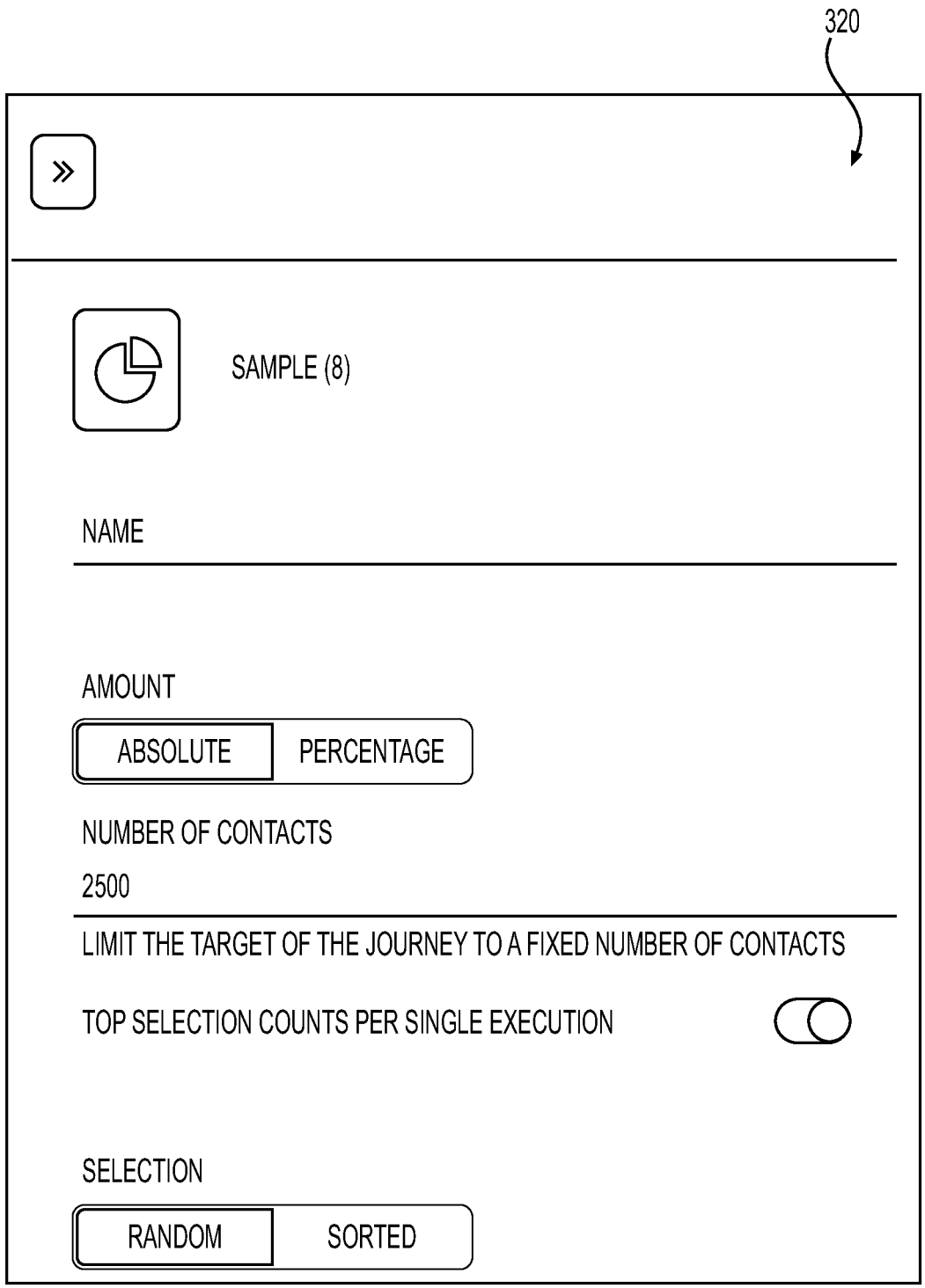
Figures 5A, 5B:
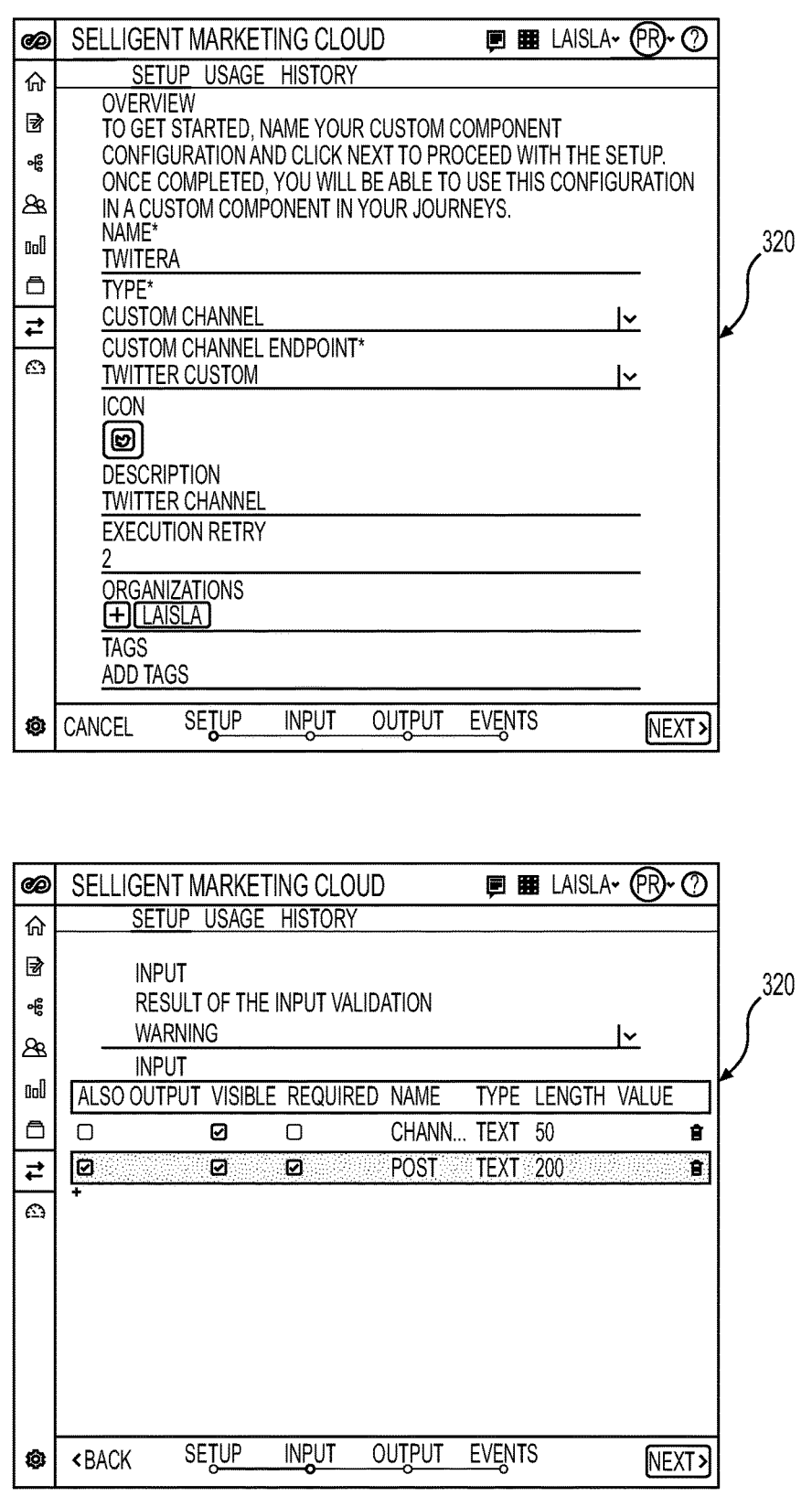
Figure 5C:
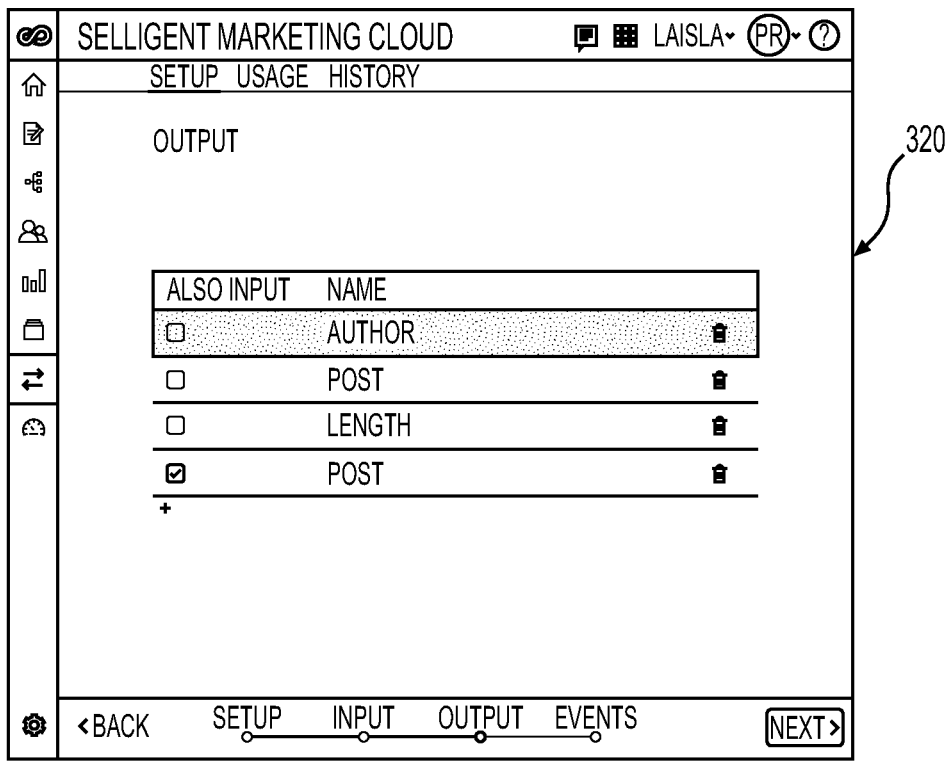
Figure 5D:
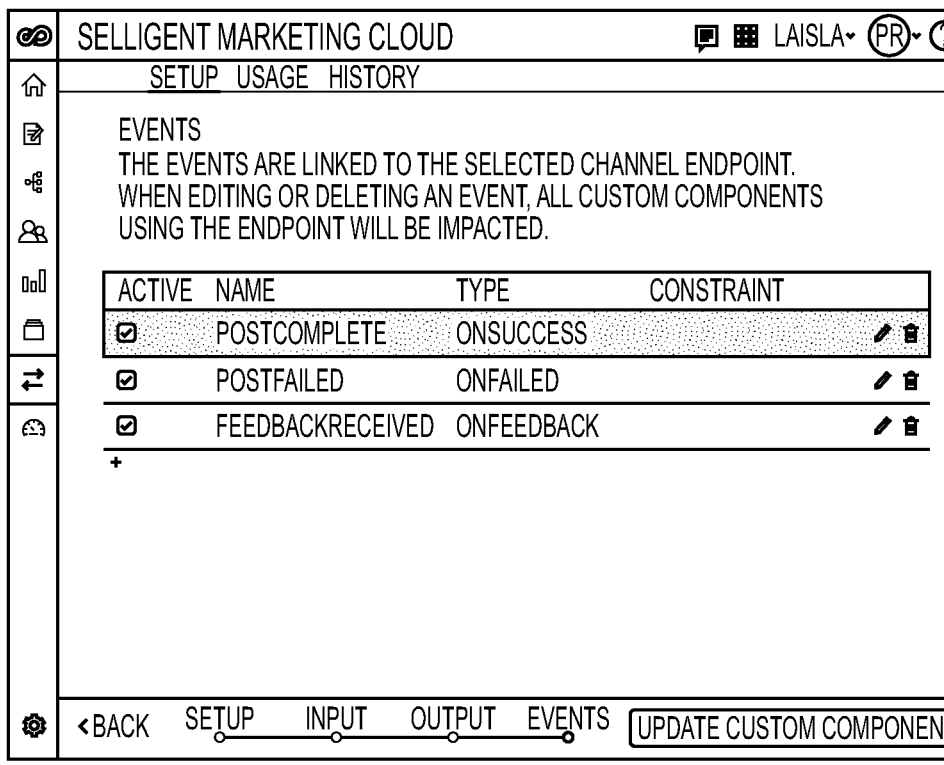

As shown in FIG. 4, in at least one embodiment, in response to the selection of the one or more components, via the drag-and-drop operation, the virtual canvas module 210 may further visualize one or more properties palates 320, via which the user may customize one or more properties of the selected component. The properties of the component define or otherwise affect the implementation of the corresponding action by the marketing system. For example, where a component requires the importation of data, the properties palate 320 can provide a field for the user to identify the data source of the to-be imported data. FIGS. 5A-5D illustrate a properties palate with multiple pages and fields reflecting a highly customizable component.

While several different components and triggers are shown and described for illustrative purposes, it will be understood that the components and triggers can respectively represent any action to be taken or any event to be considered by the marketing system in implementing the one or more scenarios. Similarly, the properties palate can reflect any property that defines or otherwise affects the implementation of the associated component.

In operation, the virtual canvas module 210 may utilize the various APIs to retrieve, from the appropriate third-party databases 220, corresponding visualization data for the components to be visualized in the component palate as component icons 304. The virtual canvas module 210 may accordingly visualize the components as component icons 304. Similarly, the virtual canvas module 210 may utilize the various APIs to retrieve, from the appropriate third-party databases 220, corresponding visualization data for the component properties to be visualized in the properties palate, and may accordingly visualize the properties therein.

The record of the scenario design may be stored in the local database 230, such that when finalized, via the graphical user interface, the build engine 250 may retrieve the record and utilize it to generate the campaign according to the designed scenarios. This may include the build engine 250 using the appropriate APIs to retrieve the actualization data for the components, which may then be utilized to generate the campaign (i.e., the set of instructions and/or actions for implementation by the marketing system). In this manner, highly customizable scenarios may be designed using third-party component data that does not have to be locally stored.

Figure 6:
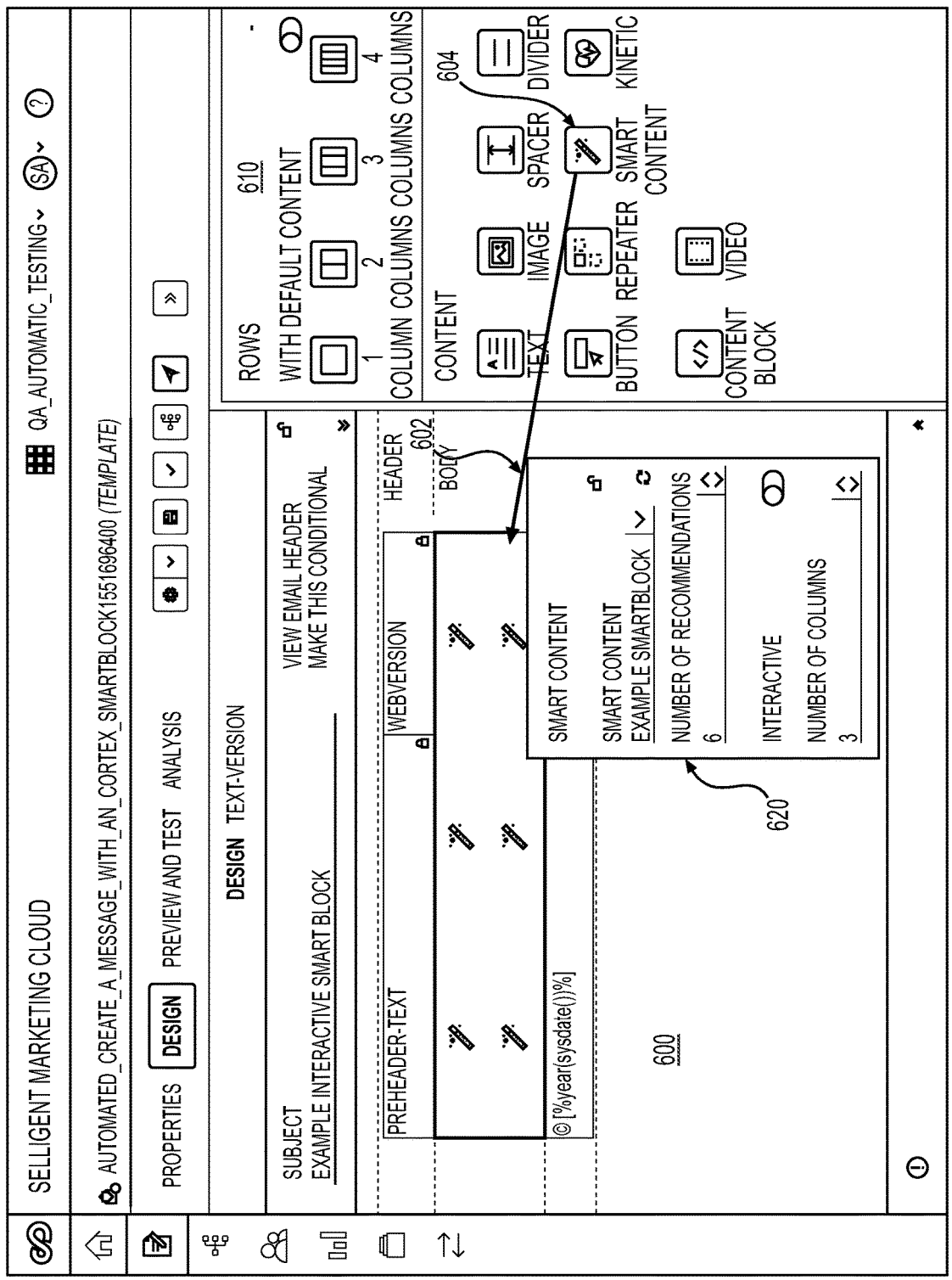
FIG. 6 illustrates aspects of the campaign design platform in which the virtual canvas may be utilized to generate electronic communications that are implementable via the marketing system.

FIG. 6 illustrates aspects of the campaign design platform in which the virtual canvas may be utilized to generate electronic communications that are highly personalized to individual recipients, which electronic communications may be implemented (e.g., sent out to recipients) via the marketing system. More particularly, FIG. 6 schematically shows an exemplary graphical user interface representing the virtual e-mail canvas 600. It will be understood, however, that the principles of the invention may be applied to other non-email electronic communications, and that the example of an e-mail is described herein to illustrate the principles of the invention.

As shown in FIG. 6, the virtual e-mail canvas 600 is an interactive graphical environment via which an e-mail may be planned and defined via drag-and-drop 602 arrangement of message components via corresponding component icons 604. The virtual e-mail canvas 600 may include a message component palate 610, in which available message components are visualized as their respective message component icons for drag-and-drop arrangement within the e-mail canvas area.

The message component may be a live-content message component. In general, a live-content message component represents software code to be included in the e-mail such that a live-content action is taken upon the e-mail being opened by the recipient. In particular, when the e-mail is opened, the live-content software code causes the email to utilize an associated API to pull content from an external data source (e.g., a source website) for visualization within the email, via the marketing system. As the pulled content is not static, but is pulled from the data source in real-time, it reflects real-time data (e.g., item availability, pricing, images, etc.).

The message component may be a smart content message component. In general, a smart-content message component represents software code to be included in the e-mail such that a smart-content action is taken in relation to the e-mail (e.g., upon compiling, sending, receipt, etc.). In particular, the smart-content software code causes the email (and/or the marketing system) to utilize an associated API to pull content from a data source, based on predictive algorithms, for visualization within the e-mail. The predictive algorithms may predict, based on product and/or customer data, the most relevant content for the recipient.

The message component may be a kinetic content message component. In general, a kinetic-content message component represents software code to be included in the e-mail such that a kinetic-content action is taken in relation to the e-mail (e.g., upon compiling, sending, receipt, etc.). In particular, the kinetic-content software code allows the recipient to meaningfully interact with the e-mail content in some way (e.g., by clicking, scrolling, swiping, tapping, etc.). For example, the kinetic-content message component may impart carousel functionality, whereby additional product images or information may be viewable by swiping, or by clicking on a "next" button, or hyperlink functionality, whereby a product image is hyperlinked to an associated online store, and/or any other kinetic functionality known in web design.

It will be further understood that, while individually discussed, the message component may further represent software code to be included in the e-mail such that any combination of live-content actions, smart-content actions and/or kinetic-content actions are implemented.

A discussion of various live content, smart content and kinetic content message components, as well as associated systems, may be found, for example, in U.S. patent application Ser. No. 16/827,046, filed on Mar. 23, 2020, as well as U.S. patent application Ser. No. 16/261,426, filed on Jan. 29, 2019, which are hereby incorporated by reference in their entireties.

In response to the selection of the one or more message components, via the drag-and-drop operation, the virtual canvas module 210 may further visualize one or more message properties palates 620, via which, similar to the properties palate, the user may customize one or more properties of the selected message component. Exemplary message properties palates for live-content components, smart-content components and kinetic-content components, respectively, are discussed in the aforementioned patent applications, which are incorporated by reference.

In operation, the virtual canvas module 210 may utilize the various APIs to retrieve, from the appropriate third-party databases 220, corresponding visualization data for the message components to be visualized in the message component palate as message component icons 604. The virtual e-mail canvas module 210 may accordingly visualize the message components as message component icons 604. Similarly, the virtual canvas module 210 may utilize the various APIs to retrieve, from the appropriate third-party databases 220, corresponding visualization data for the message component properties to be visualized in the message component properties palate, and may accordingly visualize the properties therein.

The record of the e-mail design may be stored in the local database 230, such that when finalized, via the graphical user interface, the build engine 250 may retrieve the record and utilize it to generate the designed e-mail. This may include the build engine 250 using the appropriate APIs to retrieve the actualization data for the message components, which may then be utilized to generate the e-mail—which may be an email sent to multiple recipients that is nevertheless personalized to each recipient. In this manner, e-mails that are highly personalized to individual recipients may be designed using third-party component data that does not have to be locally stored.

In some embodiments, the drag-and-drop of the message component icon 604 into the virtual e-mail canvas inserts a visualization of the component content, which may be selected via the message properties palate, or the component content itself. The visualization or content may be retrieved, as described herein, from the database via one or more APIs. For example, where an image-type component icon is drag-and-dropped into the canvas, the message properties palate may request the user identify an image or images to be inserted into the message-canvas at the drag-and-drop indicated position. Upon selection, the identified image may then be inserted into the message-canvas at the indicate position.

Thus, it will be understood that the build engine 250 and/or the virtual canvas module 210 may function in parallel to retrieve and utilize, via the various APIs, the actualization data and/or selected content for one or more of the drag-and-dropped message components, so as to insert the corresponding content into the virtual message-canvas. It will be understood, however, that the visualized component content may be merely a representation or further icon of the component content to be provided when the e-mail design is finalized and the e-mail is generated.

Figure 7:
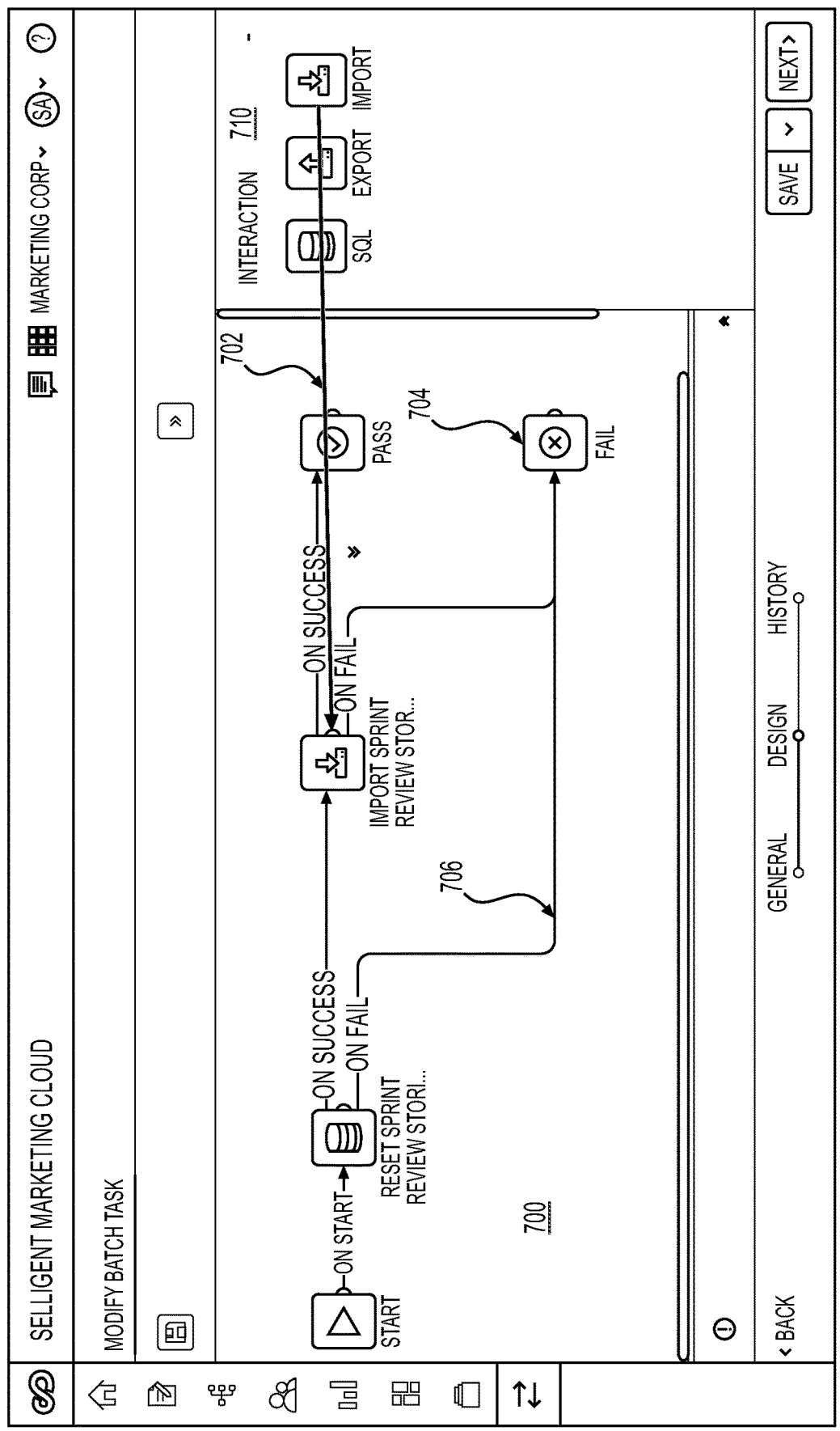
FIG. 7 illustrates aspects of the campaign design platform in which the virtual canvas may be utilized to generate data-exchange procedures that are implementable via the marketing system.

FIG. 7 illustrates aspects of the campaign design platform in which the virtual canvas may be utilized to generate data-exchange procedures implementable via the marketing system. More particularly, FIG. 7 schematically shows an exemplary graphical user interface representing the virtual data-exchange canvas 700.

As shown in FIG. 7, the virtual data-exchange canvas is an interactive graphical environment via which a data-exchange procedure may be planned and defined via drag-and-drop 702 arrangement of data-exchange component icons 704 and trigger icons 706. The virtual data-exchange canvas 700 may include a data-exchange component palate 710, in which available data-exchange components are visualized as their respective data-exchange component icons 704, and triggers 704, for drag-and-drop arrangement within the data-exchange canvas area.

Similar in operation to the embodiment shown in FIG. 3, the virtual data-exchange canvas 700 may be used by the user to set up automated imports, transformations and/or exports of data (ETLs). ETLs are processes that are used by the marketing system to collect data from various sources, transform the data based on business rules/needs, and load the data into a destination database. The properties of the data-exchange components define the parameters of the ETL, including, for example, locations, credentials, data type, etc.

Figure 8:
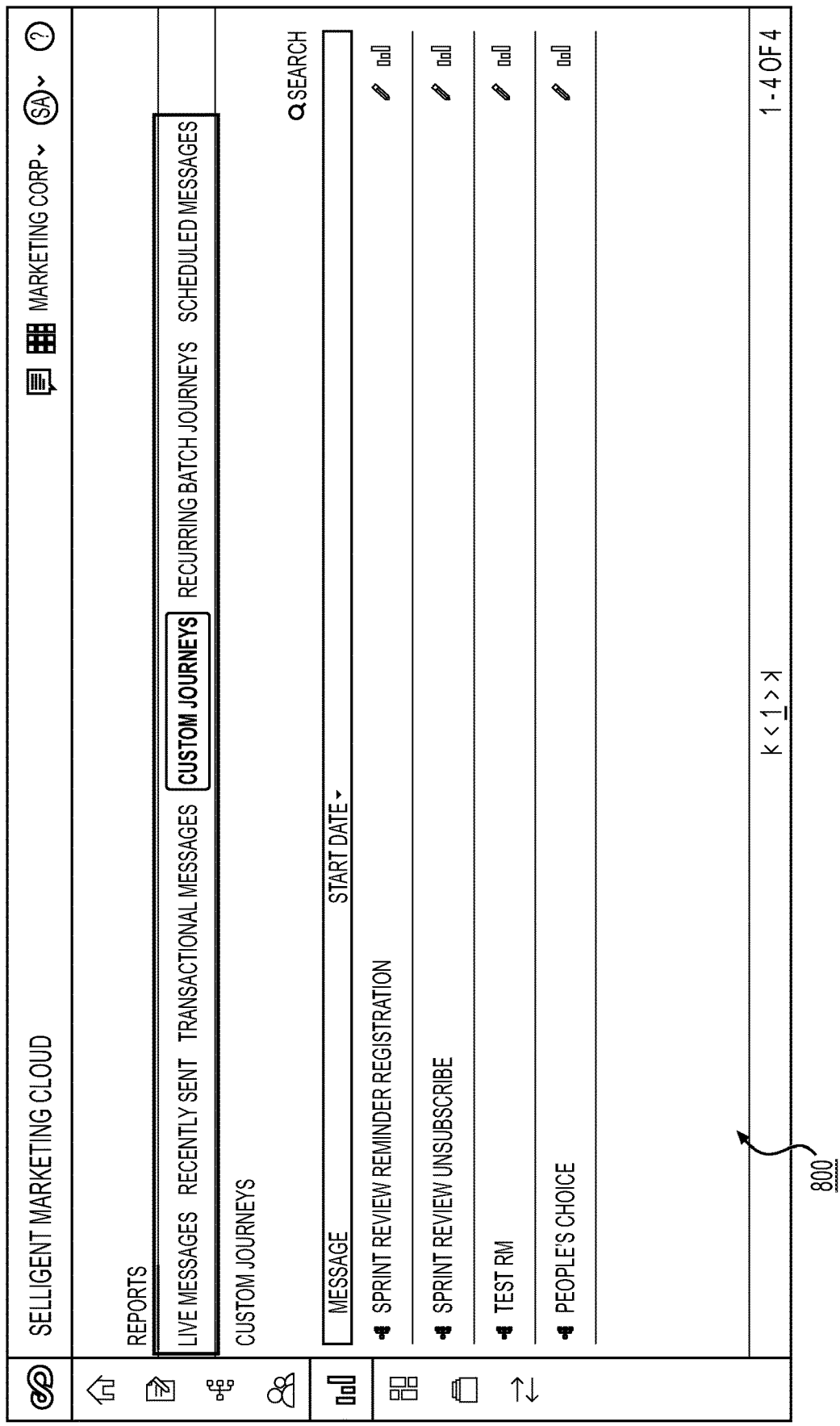
FIG. 8 illustrates aspects of the campaign design platform in which the virtual canvas may be utilized to generate reporting procedures.
Figure 9:
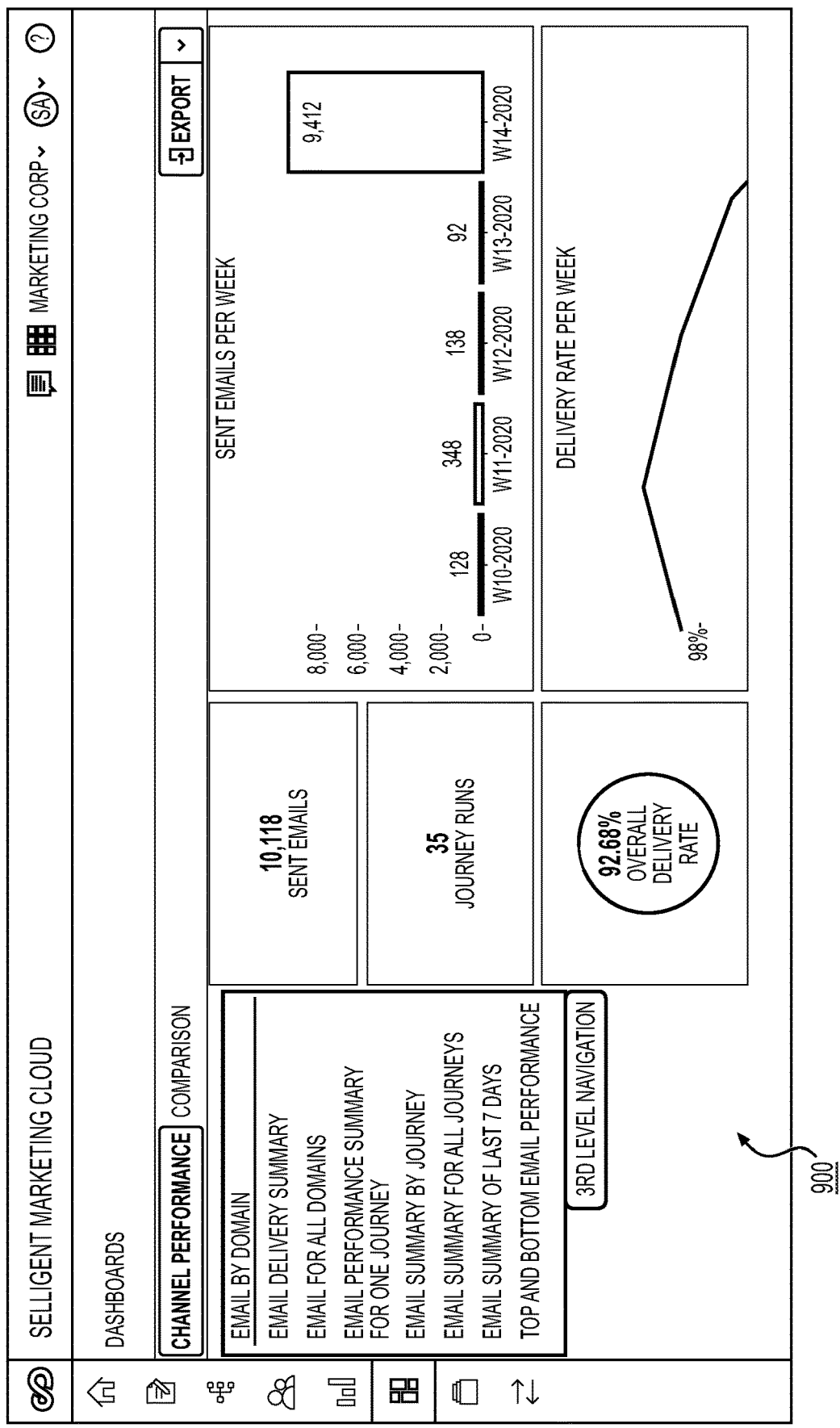
FIG. 9 illustrates aspects of the campaign design platform in which the virtual canvas may be utilized to generate a dashboard.

FIG. 8 illustrates aspects of the campaign design platform in which the virtual canvas may be utilized to generate reporting procedures implementable via the marketing system. More particularly, FIG. 8 schematically shows an exemplary graphical user interface representing a reporting canvas 800. Similar in operation to the embodiment shown in FIG. 3, the reporting canvases 800 may be used by the user to set up reporting procedures, including defining reports, via drag-and-drop arrangement of reporting component icons (not shown). The corresponding reporting components may add additional reporting sections or tabs to the generated (e.g., visualized) report, the properties of which may determine the data shown, filtering, sorting, etc. The reporting components may be reports reflecting system status, external data, campaign-status, broadcast status, ETL status, etc., and the data reflected in the reports may be internal or external data, may be loaded in real-time or not, and may include aggregated data. The reports may be provided via an interactive dashboard 900, as shown for example in FIG. 9. Similar in operation to the embodiment shown in FIG. 3, the interactive dashboard (not shown) may also be set up via a dashboard canvas, via drag-and-drop arrangement of dashboard components icons.

Figure 10:
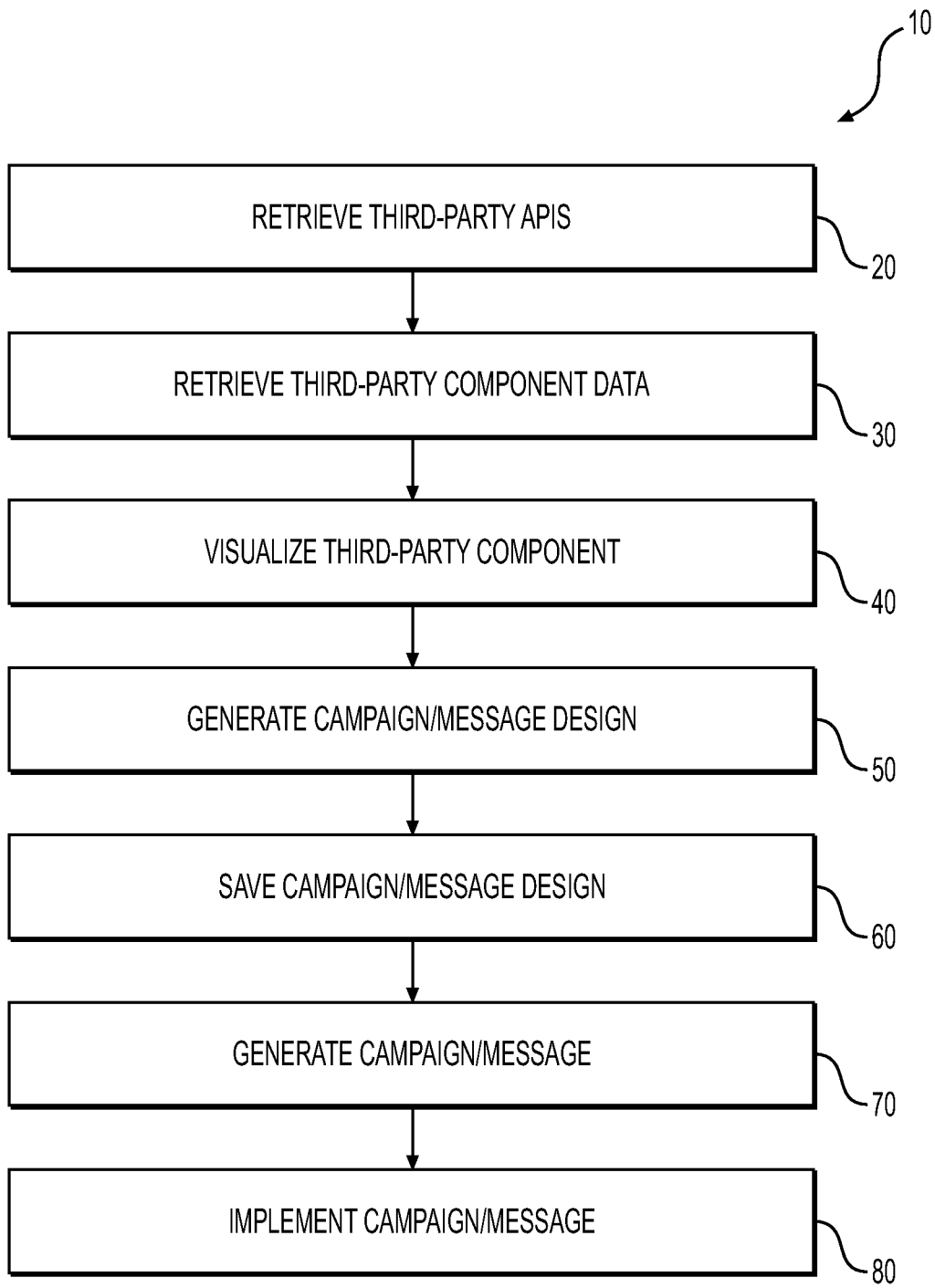
FIG. 10 illustrates an exemplary method for designing campaigns using the campaign design platform in accordance with at least one aspect of the invention.

FIG. 10 illustrates an exemplary method 10 for designing campaigns using the campaign design platform in accordance with at least one aspect of the invention. It should be reiterated that the method can be equally applied to an overall campaign, or sets of operations that are not the entire campaign, such as the generation of electronic messages, in accordance with aspects of the invention.

In Step 20, the virtual canvas module 210 retrieves the third-party API corresponding to the third-party component to be visualized in the virtual canvas. The third-party API may be retrieved from the local database 230.

In Step 30, the virtual canvas module 210 retrieves third-party component data corresponding to the third-party component to be visualized. The third-party component data is retrieved from the third-party database 220 using the third-party API. The retrieving of the third-party component data includes retrieving at least the visualization data of the third-party component.

In Step 40, the virtual canvas module 210 causes the visualization of the third-party component in the virtual canvas via the graphical user interface, based on the visualization data. The visualization of the third-party component may include visualization of user adjustable parameters of the component.

In Step 50, the virtual canvas module 210 generates the campaign/message design in response to the use arranging the component icon in the virtual canvas via the graphical user interface. The arrangement of the component may be with respect to other component icons. The arrangement may be via a drag-and-drop operation and/or user selection of parameters for the component.

In Step 60, the virtual canvas module 210 retrievably saves the campaign/message design to local storage, including interactions between components, as well as respectively selected parameters.

In Step 70, the build engine 250 generates the campaign/message from the campaign/message design. The generation of the campaign/message may include retrieving the third-party component data of the component included in the campaign/message design from the third-party database 220. The third-party component data is retrieved from the third-party database 220 using the third-party APIs. The retrieving of the third-party component data includes retrieving at least the actualization data of the third party component. The generation of the campaign/message includes providing software code associated with the component, as indicated by the campaign/message design.

In Step 80, the campaign/message is implemented by the marketing system. The implementation of the campaign/message may include implementing operations or actions, as indicated by the campaign/message design. In some cases, this may include implementing designed sub-campaigns within larger campaigns, and/or electronic messages within campaigns.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The invention claimed is:

1. A system for facilitating user design of a computerized marketing system executable campaign, comprising:
 a processor;
 a memory;
 a user interface module on the processor configured to support a graphical user interface for user interaction with a virtual canvas;
 a virtual canvas module on the processor configured to:
  retrieve, from a third-party database, component data that includes: visualization data useable by the virtual canvas module to visualize component icons;
  provide the virtual canvas, via which the component icons are visibly arrangeable by the user into a campaign design, wherein each component icon represents an action to be taken by the computerized marketing system in executing the campaign; and finalize the campaign design by saving the campaign design in a local database on the memory of the computerized marketing system; and a build engine on the processor configured to:
retrieve, from the third-party database in response to the finalization of the campaign design, actualization data corresponding to one or more component icons arranged by the user into the finalized campaign design, wherein the actualization data comprises software code that allows the computerized marketing system to implement the action represented by the one or more component icons, and generate the campaign from and in accordance with the campaign design and using the actualization data.

2. The system of claim 1, wherein the virtual canvas module on the processor is configured to:
visualize triggers associated with the component icons, the triggers representing events in response to the which the action to be taken by the computerized marketing system with respect to an associated component icon is taken by the computerized marketing system.

3. The system of claim 2, wherein the triggers, via the virtual canvas, are visibly arrangeable by the user to link two or more component icons into the campaign design.

4. The system of claim 2, wherein the campaign design is an arrangement of two or more component icons linked by one or more triggers.

5. The system of claim 4, wherein the campaign is an ordered set of actions to be taken by the computerized marketing system.

6. The system of claim 1, wherein the component icons are visibly arrangeable by the user via a drag-and-drop.

7. The system of claim 1, wherein the third-party database supported by a third-party server system accessible by the system via one or more APIs stored in the local database supported by a local server system.

8. A system for facilitating user design of an electronic message, comprising:
a processor;
a memory;
a user interface module on the processor configured to support a graphical user interface for user interaction with a virtual canvas;
a virtual canvas module on the processor configured to:
retrieve, from a third-party database, component data that includes: visualization data useable by the virtual canvas module to visualize components and corresponding component content,
provide the virtual canvas, via which component icons corresponding to the components are visibly arrangeable by the user into a message design, wherein each component icon represents software code to be included in the electronic message such that an action is taken in relation to the electronic message; and
finalize the message design by saving the message design in a local database on the memory of the system; and
a build engine on the processor configured to:
retrieve, from the third-party database in response to the finalization of the message design, actualization data corresponding to one or more component icons arranged by the user into the finalized message design, wherein the actualization data comprises software code that allows the system to implement the action represented by the one or more component icons, and generate the electronic message from and in accordance with the message design and using the actualization data.

9. The system of claim 8, wherein the components are visibly arrangeable by the user via a drag-and-drop.

10. The system of claim 8, wherein the third-party database supported by a third-party server system accessible by the system via one or more APIs stored in the local database supported by a local server system.

11. A system for facilitating user design of a data-exchange procedure, comprising:
a processor;
a memory;
a user interface module on the processor configured to support a graphical user interface for user interaction with a virtual canvas;
a virtual canvas module on the processor configured to:
retrieve, from a third-party database, component data that includes: visualization data useable by the virtual canvas module to visualize component icons,
provide the virtual canvas, via which the component icons are visibly arrangeable by the user into a data-exchange procedure design, wherein each component icon represents an action to be taken by one or more of a plurality of systems in executing the data-exchange procedure; and
finalize the data-exchange procedure design by saving the data-exchange procedure design in a local database on the memory of the system; and
a build engine on the processor configured to:
retrieve, from the third-party database in response to the finalization of the data-exchange procedure design, actualization data corresponding to one or more component icons arranged by the user into the finalized data-exchange procedure design, wherein the actualization data comprises software code that allows the system to implement the action represented by the one or more component icons, and generate the data-exchange procedure from and in accordance with the data-exchange procedure design and using the actualization data.

12. The system of claim 11, wherein the component icons are visibly arrangeable by the user via a drag-and-drop.

13. The system of claim 11, wherein the third-party database supported by a third-party server system accessible by the system via one or more APIs stored in the local database supported by a local server system.

14. A method for facilitating user design of a computerized marketing system executable campaign or message thereof, comprising:
providing a graphical user interface module for user interaction with a virtual canvas;
retrieving, from a third-party database, component data that includes: visualization data useable by a virtual canvas module to visualize component icons,
visibly arranging, within the virtual canvas and in response to user interaction with the virtual canvas via the user interface, the component icons into at least one of: a campaign design or a message design, wherein each component icon represents an action to be taken by the computerized marketing system in executing the campaign and/or the message thereof;
finalizing the at least one of a campaign design or message design by saving the at least one of a campaign design or message design in a local database on a memory of the computerized marketing system; and retrieving, from the third-party database in response to the finalization of the at least one of a campaign design or message design, actualization data corresponding to one or more component icons arranged by the user into the finalized at least one of a campaign design or message design, wherein the actualization data comprises software code that allows the computerized marketing system to implement the action represented by the one or more component icons, and generating, by a build engine, the campaign and/or the message from and in accordance with the respective campaign design and/or message design and using the actualization data.

15. The method of claim 14, wherein the component icons are visibly arrangeable by the user via a drag-and-drop.

16. The method of claim 14, wherein the third-party database supported by a third-party server system accessible by the system via one or more APIs stored in the local database supported by a local server system.

\* \* \* \* \*